United States Patent [19]

Gregson

[11] Patent Number: 4,489,491
[45] Date of Patent: Dec. 25, 1984

[54] CUTTING TOOL FOR JACKETED CABLE

[75] Inventor: Donald L. Gregson, Paradise, Calif.

[73] Assignee: Harris Corporation, Chatsworth, Calif.

[21] Appl. No.: 412,889

[22] Filed: Aug. 30, 1982

[51] Int. Cl.$^3$ .............................................. B21F 13/00
[52] U.S. Cl. ........................................ 30/90.7; 30/90.8
[58] Field of Search .................... 30/90.1, 90.4, 90.7, 30/91.2, 90.8, 90.6

[56] References Cited

U.S. PATENT DOCUMENTS

| 2,141,002 | 12/1938 | Huff | 30/91.2 X |
| 2,388,698 | 11/1945 | Montgomery | 30/90.7 |
| 3,091,031 | 5/1963 | Grant | 30/90.7 |

FOREIGN PATENT DOCUMENTS 1080647  4/1960  Fed. Rep. of Germany ....... 30/91.2

*Primary Examiner*—Jimmy C. Peters

*Attorney, Agent, or Firm*—Flehr, Hohbach, Test, Albritton & Herbert

[57] ABSTRACT

A tool for cutting the outer jacket of a cable, especially coaxial cable, is disclosed herein. This tool utilizes a main body which supports a downwardly extending knife edge from its underside. A gripping tray which is at least as long as the normal width of four adult fingers and which is adapted to receive a longitudinal section of the cable to be cut is supported by the main body under its depending knife edge for movement between a first lowermost position sufficiently far from the knife edge to place the cable section out of engagement with the latter and a second raised position sufficiently close to the cutting edge for placing the outer jacket of the cable section in cutting engagement with the knife edge. In this way, an individual user can place the tray in its raised position using all four fingers of one hand while pulling the cable longitudinally through the tray with his other hand in order to cause the knife edge to cut its outer jacket in the longitudinal direction.

2 Claims, 7 Drawing Figures

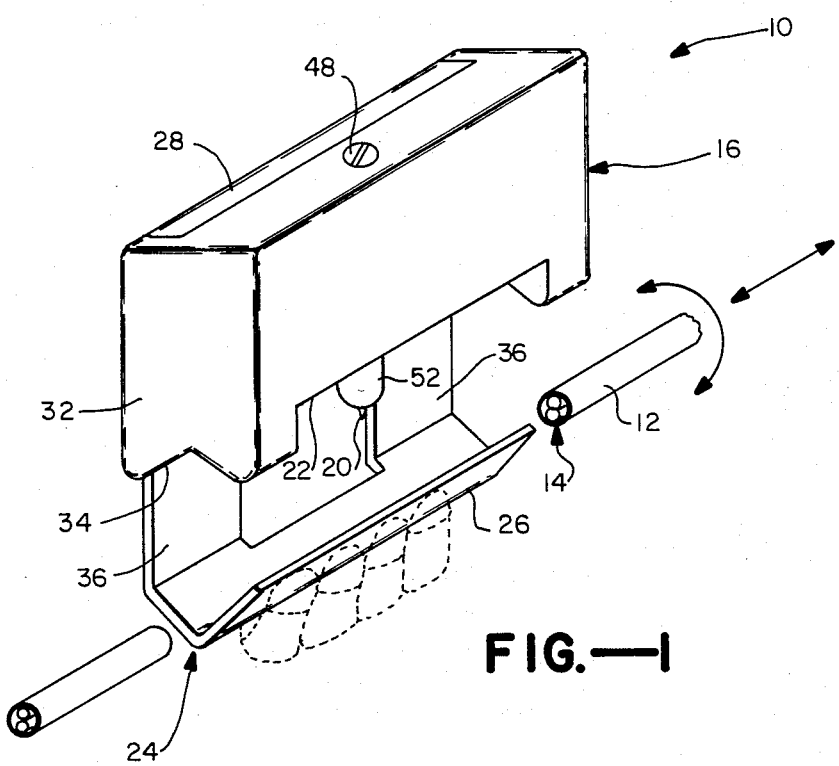
FIG.—1
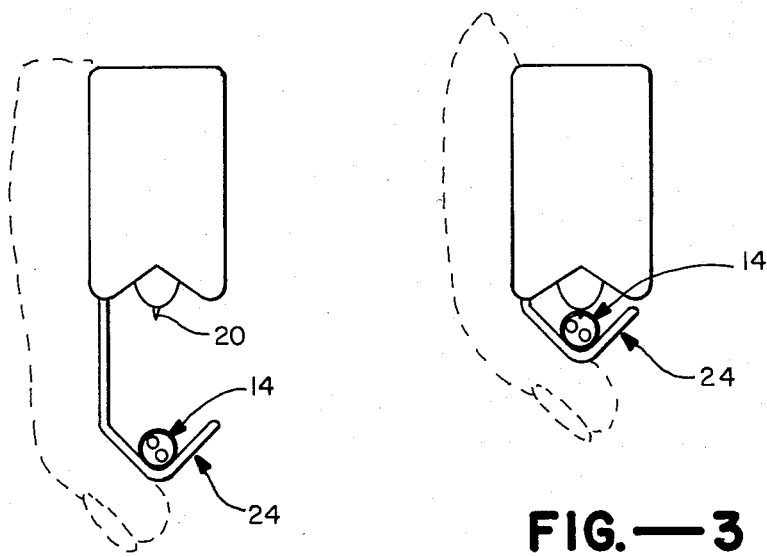
FIG.—2
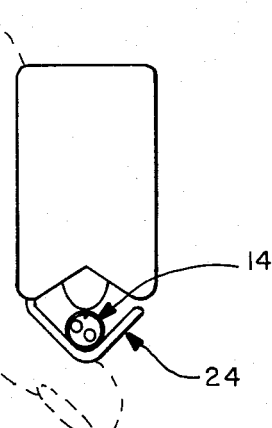
FIG.—3

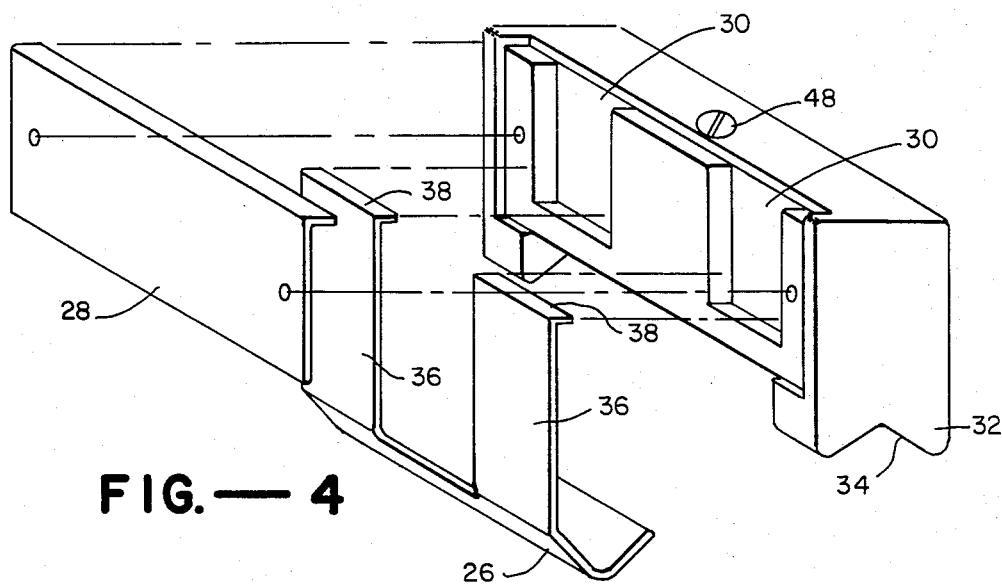
FIG.—4
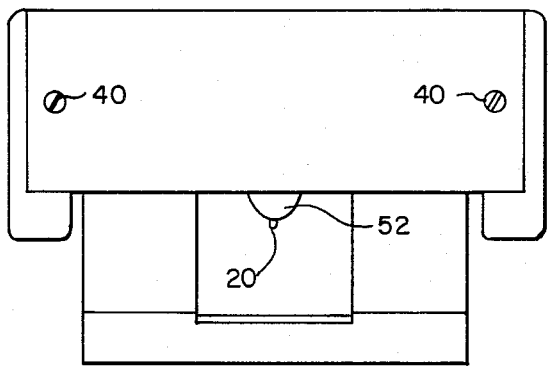
FIG.—5
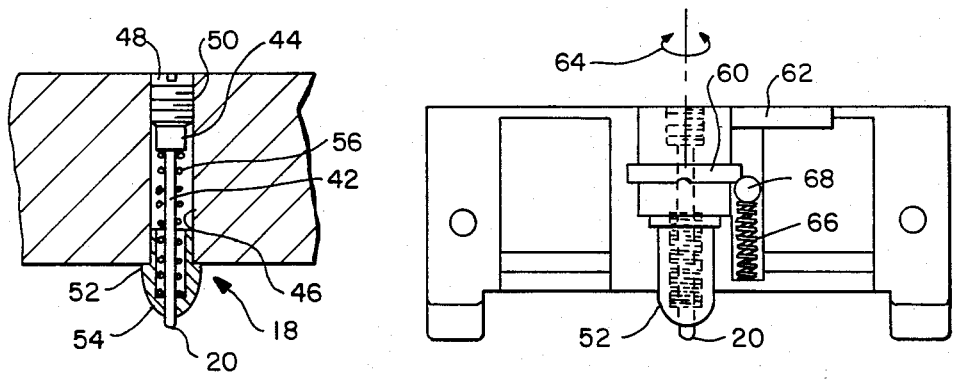
FIG.—6  FIG.—7

CUTTING TOOL FOR JACKETED CABLE

The present invention relates generally to cutting tools and more particularly to a hand gripping type of tool or device for cutting the outer jacket of multiconductor telephone cable or like electrical cable and specifically one which is designed to be gripped by a user's entire hand.

One tool which is presently available for cutting the outer jacket of an electrical cable includes a main support body having a downwardly depending knife edge supported from its underside and a gripping bracket adapted to receive a longitudinal section of the cable. This gripping bracket is supported by the main body under its knife edge for movement between a first lowermost position sufficiently far from the knife edge to place the cable section out of engagement with the latter and a second raised position sufficiently close to the knife edge for placing it in cutting engagement with the cable's outer jacket. In this way, an individual user can place the gripping bracket in its raised position after receiving a section of the cable and thereafter the cable can be pulled longitudinally through the bracket in order to cause the knife edge to cut its jacket in the longitudinal direction.

While the cutting tool just described is generally satisfactory for its intended purpose, it does have one particular design failing. Specifically, its gripping bracket is quite short longitudinally. In fact, it is at most as long as the normal width of a single adult finger. As a result, the user can use only one finger for forcing the bracket into its cutting position. Applicant has found that the use of a single finger as opposed to the whole hand (all four fingers) does not always provide the necessary force to cut the cable jacket, especially if the jacket is relatively thick and/or constructed of relatively strong material such as some of the TEFLON or HALAR jackets. Moreover, the utilization of a single finger does not always provide suitable gripping control during the cutting procedure.

In view of the foregoing, it is one object of the present to provide a cable jacket cutting tool which is designed for gripping by the user's full hand (all four fingers).

Another object of the present invention is to provide a cable jacket cutting tool having means carrying a knife edge which is designed to cut the outer cable jacket in the longitudinal direction without interruptions otherwise resulting from irregularities in the outer jacket surface.

Still another object of the present invention is to provide a cable jacket cutting tool alternatively capable of cutting lengthwise along the jacket and circumferentially around the latter in an uncomplicated fashion.

As will be seen hereinafter, the cutting tool or device disclosed herein is similar to the one described above to the extent that it utilizes a main support body including a knife edge depending from its underside. However, the device disclosed herein includes a gripping tray rather than the bracket recited above for receiving a longitudinal section of the cable to be cut. This tray like the previously recited bracket is supported by its main body between a lowermost position spaced from the knife edge and a raised cutting position. However, the gripping tray is specifically designed in accordance with the present invention to be at least as long as the normal width of four adult fingers, whereby an individual user can place the tray in its raised position using all four fingers of one hand while pulling the cable longitudinally through the tray with his other hand in order to cause the knife edge to cut its outer jacket in the longitudinal direction.

In a preferred embodiment of the present invention, the knife edge is supported below a lowermost spherical surface forming part of a dome extending downwardly from the underside of the main support body. The spherical surface of this dome cooperates with the outer surface of the cable jacket being cut and particularly any irregularities that might be present for insuring that the longitudinal cut is continuous. In an alternate embodiment, means are provided for rotating the knife edge 90° so that the cable jacket can be cut circumferentially by rotating the cable section about its own axis within the gripping tray as the latter is maintained in its raised cutting position.

The overall device just discussed briefly will be described in more detail hereinafter in conjunction with the drawings wherein:

FIG. 1 is a perspective view of this device constructed in accordance with the present invention and shown in relationship to the user's hand;

FIG. 2 is a side elevational view of the device shown in FIG. 1;

FIG. 3 is a view similar to the view shown in FIG. 2 illustrating the device in its cable jacket cutting position;

FIG. 4 is an exploded perspective view of the device illustrated in FIG. 1;

FIG. 5 is a back elevational view of the device illustrated in FIG. 1;

FIG. 6 is a sectional view of a portion of the device illustrated in FIG. 1 and is specifically illustrating an arrangement for containing its knife edge; and FIG. 7 is a view similar to FIG. 6 but showing an alternate arrangement for supporting its knife edge.

Turning now to the drawings, wherein like components are designated by like reference numerals throughout the various figures, attention is first directed to FIG. 1. This figure illustrates a tool or device 10 for cutting the outer jacket 12 of a multiconductor telephone cable or like electrical cable (or any other cable having a cuttable jacket) generally indicated at 14. Device 10 is shown including a generally rectangular main support body 16, an arrangement generally indicated at 18 (see FIG. 6) supported by main body 16 and having a knife edge 20 depending from the main body's underside 22, and a gripping tray arrangement 24. This arrangement includes a gripping tray 26 adapted to receive a longitudinal section of cable 14. As will be seen hereinafter, the tray is supported by main body 16 for movement between a lowermost position sufficiently far from knife edge 20 to place the received cable section out of engagement with the knife edge and a second raised position sufficiently close to the knife edge for placing the cable's outer jacket 12 in cutting engagement therewith.

Referring to FIGS. 4 and 5 in conjunction with FIG. 1, main body 16 is shown including a disengagable back plate 28 which provides access to a pair of vertically extending, spaced apart pockets 30. The main body also includes a pair of legs generally indicated at 32 which extend downwardly from underside 22 at opposite ends of the latter and which include inverted V-shaped grooves, that is, V-shaped grooves which open downwardly.

As stated previously, tray arrangement 24 includes a gripping tray 26 adapted to receive a longitudinal section of cable 14, as best illustrated in FIGS. 2 and 3. The gripping tray is specifically designed in accordance with the present invention to be at least as long as the normal width of four adult fingers as best shown by the phantom illustration in FIG. 1. This tray is preferably V-shaped in cross sectional configuration, thereby opening upwardly and is supported in vertical alignment to and below the underside 22 of main body 16 by means of integrally formed support arms 36. These support arms extend vertically upwardly from a common side of the gripping tray at opposite ends of the latter in spaced relationship to one another and include turned in top end sections 38 as shown in FIG. 4. These turned in sections are specifically configured to fit loosely within pockets 30 and the back plate 28 lock them within these pockets, except for free vertical movement therein. In this way, the gripping tray itself is biased by its own weight in the lowermost position illustrated in FIG. 2 but is readily movable to a raised position illustrated in FIG. 3. The back plate 28 is fixedly held in place to the rest of main body 16 by any suitable means such as the screws 40 (see FIG. 5).

Referring to FIG. 6, arrangement 18 including knife edge 20 is shown in detail. As seen there, the knife edge forms a lowermost end section of an elongated shaft 42 having an enlarged top end section 44. This shaft is disposed within a cooperating opening 46 in main body 16 directly below an adjustment screw 48 disposed within its own cooperating threaded opening 50. A dome 52 having a lowermost generally spherical outer surface 54 is located directly under opening 46 and is bonded or otherwise fixedly connected to under side 22. The dome is provided with its own through-hole to accommodate shaft 42 so that knife edge 20 is disposed below spherical surface 54 as shown in FIG. 6. At the same time, a compression spring 56 is disposed around shaft 42 between a fixed surface within dome 52 and enlarged shaft section 44. This biases the entire shaft upwardly against the under side of adjustment screw 48. As a result, as the screw is adjusted upwardly, the entire shaft and knife edge 20 are forced upwardly by the compression spring. On the other hand, as the screw is adjusted downwardly, the entire shaft and its knife edge are moved in the downward direction against the force of spring 56. In this way, the knife edge can be placed in various adjustable positions below dome surface 56 or it can be moved into the dome when not in use.

Having described overall device 10 structurally, attention is now directed to the way in which it is used to cut jacket 12 of cable 14 in the longitudinal direction. At the outset, the knife edge 20 is placed in the desired cutting position relative to dome surface 54. A section of cable 14 is then placed in tray 26 while the latter is in its cable receiving lowermost position illustrated in FIG. 2. At that time, the user grips the entire device so as to pull the tray upwards to its raised position shown in FIG. 3 using all four fingers of one hand. This places cable jacket 12 in cutting engagement with the knife edge as seen in FIG. 3. Thereafter, the cable is pulled longitudinally through the tray with the other hand. As seen specifically in FIG. 3, as the knife edge 20 cuts through jacket 12, generally spherical surface 54 rides along the outermost surface of the jacket immediately around the knife edge. However, no other part of the device engages the cable, except of course for tray 26.

As a result, the knife edge and spherical surface 54 will track the outer surface of cable jacket 12 including any irregularities so as to reduce and hopefully entirely prevent the presence of discontinuities in the longitudinal cut. By providing a long gripping tray as opposed to a single fingered one as described above, the user can provide a greater degree of force against the tray and greater control.

Overall device 10 as illustrated in FIGS. 1–6 has been described as one which cuts cable jacket longitudinally. To this end, the cutting knife 20 is oriented longitudinally with respect to cable 14 as the latter sits in tray 26. However, it is possible to design the device so that its cutting knife can also be positioned 90° from its longitudinal position for providing a circumferential cut around the cable jacket. More specifically, by rotating the cutting knife so that it extends perpendicular to the axis of cable 14 when the latter sits in tray 26 and by bringing the cable's jacket into cutting engagement with the knife while the cable is rotated about its own axis within the tray, a circumferential cut can be provided.

Any suitable means for allowing knife 20 to rotate between its normal longitudinal position illustrated in FIG. 1 and a perpendicular position may be provided. FIG. 7 specifically illustrates one such means. As seen in this latter figure, a cutting knife 20 and its associated components previously recited, specifically its dome 52, shaft 42, spring 56 and enlarged shaft end 48 are provided along with an enlarged flange 60. The latter cooperates with a handle 62 which causes the cutting knife 20 and its associated shaft to rotate between its longitudinal and perpendicular positions when the handle 62 is rotated between corresponding positions, as indicated by the arrow 64. A spring 66 supporting an indent ball 68 cooperate with flange 60 for maintaining the handle 62 and cutting edge 20 in their alternate positions.

What is claimed is:

1. A device for cutting the outer jacket of coaxial or like cable, comprising: a main support body having a longitudinally extending underside; means supported by said main body and including a dome depending from said underside and having a lowermost generally spherical surface, a knife edge extending downwardly from said lowermost spherical surface and means for adjusting the position of said knife edge relative to said generally spherical surface; and a longitudinally extending, upwardly opening V-shaped gripping tray at least as long as the normal width of four adult fingers adapted to receive a longitudinal section of said cable, said tray being supported by said main body under said knife edge for movement between a first biased lowermost position sufficiently far from said knife to place said cable section out of engagement with the latter and a second raised position sufficiently close to said cutting edge for placing the outer jacket of said cable section in cutting engagement with said knife edge, whereby an individual user can place the tray in its raised position using all four fingers of one hand while pulling the cable longitudinally through the tray in order to cause the knife to cut its outer jacket in the longitudinal direction.

2. A device according to claim 1 including means for rotating the knife edge about its own axis between a first position parallel to the longitudinal direction of said tray and a second position normal to the longitudinal direction of said tray.

* * * * *